United States Patent
Uchiyama et al.

(10) Patent No.: US 7,313,967 B2
(45) Date of Patent: Jan. 1, 2008

(54) PRESSURE ABNORMALITY DETECTING DEVICE FOR INJECTION MOLDING MACHINE

(75) Inventors: Tatsuhiro Uchiyama, Gotenba (JP); Minoru Kobayashi, Yamanashi (JP); Shingo Komiya, Tsuru (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/359,601

(22) Filed: Feb. 23, 2006

(65) Prior Publication Data

US 2006/0191347 A1    Aug. 31, 2006

(30) Foreign Application Priority Data

Feb. 25, 2005    (JP) ............................. 2005-050565

(51) Int. Cl.
*G01L 7/08* (2006.01)
(52) U.S. Cl. ...................................................... 73/714
(58) Field of Classification Search ................. 73/714; 264/40.1
See application file for complete search history.

(56) References Cited

U.S. PATENT DOCUMENTS

| | | | | |
|---|---|---|---|---|
| 4,851,170 A * | 7/1989 | Shimizu et al. | ............ | 264/40.5 |
| 5,342,559 A * | 8/1994 | Kamiguchi et al. | ........ | 264/40.1 |
| 5,425,906 A * | 6/1995 | Hashimoto | .................. | 264/40.1 |
| 5,567,367 A * | 10/1996 | Ito et al. | .................... | 264/40.1 |
| 5,585,053 A * | 12/1996 | Arai | ........................... | 264/40.1 |
| 5,817,258 A * | 10/1998 | Ito et al. | .................... | 264/40.1 |
| 2002/0192322 A1* | 12/2002 | Tsutsui et al. | ............... | 425/145 |
| 2004/0139810 A1* | 7/2004 | Saito et al. | ................. | 73/865.9 |
| 2005/0092113 A1* | 5/2005 | Saito et al. | ................. | 73/865.9 |

FOREIGN PATENT DOCUMENTS

| | | |
|---|---|---|
| JP | 59-71836 | 4/1984 |
| JP | 62-044416 | 2/1987 |
| JP | 5-58250 | 8/1993 |
| JP | 7-001522 | 1/1995 |
| JP | 2002-254485 | 9/2002 |
| JP | 2003-300236 | 10/2003 |

OTHER PUBLICATIONS

European Search Report, mailed Jan. 26, 2007, and issued in corresponding European Patent Application No. 06250769.4-1253.

* cited by examiner

*Primary Examiner*—Andre J. Allen
(74) *Attorney, Agent, or Firm*—Staas & Halsey LLP

(57) ABSTRACT

An injection screw position Xa, injection speed Va, and injection pressure Pa are read. A deceleration distance D the injection screw moves from the point where the injection operation has been stopped at the current moment to be decelerated by maximum deceleration till the point where the injection speed is reduced to zero is determined from a corrected deceleration in which the amount of correction α is added to a predetermined deceleration A inherent in the machine and the read injection speed Va. The determined deceleration distance D is multiplied by the amount of change in injection pressure with respect to the amount of change in the injection screw position to determine a predicted increment in pressure (D·ΔP/ΔX). The predicted increment in pressure is added to the current injection pressure Pa to determine an injection pressure Pa* predicted when the screw is suddenly decelerated at the current moment. If the predicted injection pressure Pa* exceeds the predetermined limit pressure Pmax, the injection operation is stopped to decelerate the screw.

10 Claims, 4 Drawing Sheets

| SPEED AT STARTING DECELERATION | DECELERATION DISTANCE |
|---|---|
| 1 mm/s | 1 mm |
| 2 mm/s | 1.5 mm |
| ... | ... |
| Mm/s | Nmm |

FIG. 5

PRESSURE ABNORMALITY DETECTING DEVICE FOR INJECTION MOLDING MACHINE

BACKGROUND OF THE INVENTION

1. Field of the Invention

The present invention relates to a pressure abnormality detecting device for detecting abnormality of an injection pressure in an injection molding machine.

2. Description of the Related Art

In an injection molding machine, an injection process is first performed in which an injection screw is advanced to inject molten resin inside an injection cylinder into a clamped mold, thereafter followed by such processes as dwelling, cooling, metering, mold opening, unloading parts, mold closing, and mold clamping. In the injection process, molten resin can choke a mold or a nozzle portion fitted at the end of an injection cylinder by the influence of resin temperature and others, thereby increasing an injection pressure. An excessive increase in pressure will result in damage to a mold, injection cylinder, and nozzle, so that an automatic control has been performed by detecting an abnormal increase in pressure using some sort of means to stop an injection operation.

For example, some methods are known in which a sensor is provided to detect and monitor the injection pressure and when a detected injection pressure exceeds a predetermined upper limit, an injection operation is stopped (refer to Japanese Patent Application Laid-Open No. 62-44416, Japanese Utility Model Application Laid-Open No. 5-58250, and Japanese Patent Application Laid-Open No. 2002-254485).

Even if the injection operation is stopped, a slight advance of the injection screw during deceleration (inertial flow) can not be avoided due to the inertia of a driving system for the injection screw, leading to an abnormal increase in a resin pressure, which may break a mold, injection cylinder, and nozzle. The following method has been known, with the above in view, in which first an increment in pressure during an inertial flow at an injection speed of maximum to zero is obtained, and secondly an increment in pressure during the inertial flow at the current moment is obtained from the increment in pressure during the inertial flow at the maximum injection speed, the current speed of the injection screw, and the maximum injection speed, and then if the sum of the current injection pressure and the increment in pressure during the inertial flow at the current moment exceeds a predetermined limit pressure, the injection screw is stopped (refer to Japanese Patent Application Laid-Open No. 2003-300236).

A control method disclosed in Japanese Patent Application Laid-Open No. 7-1522 does not detect an abnormal increase in the injection pressure, but an injection pressure is predicted and the process is changed from injection to dwelling with consideration for response characteristic (delay time) of an injection actuator. In the control method, a time required to reach the maximum injection pressure is first determined from the maximum injection pressure (set value) for changing the injection process to the dwelling process and the current pressure, and secondly a deceleration time is determined from a predetermined deceleration characteristic and a set injection speed. When the determined deceleration time exceeds the time required to reach the maximum injection pressure, a deceleration pattern for shifting to the dwelling process is generated.

In the foregoing methods disclosed in the publications of Japanese Patent Application Laid-Open No. 62-44416, Japanese Utility Model Application Laid-Open No. 5-58250, and Japanese Patent Application Laid-Open No. 2002-254485, an injection pressure is detected, and if a detected injection pressure exceeds a set upper limit, the injection operation is stopped. However, when the injection pressure has been detected with this method, the injection pressure had already exceeded the set upper limit. For this reason, it is necessary to provide the set upper limit some margin. An excessive margin may stop the injection operation detected as an abnormal injection in spite of a normal injection operation, on the other hand, a too small margin may increase the injection pressure to exceed the set upper limit due to the influence of inertia and others even if the injection operation is stopped, resulting in damage to a mold and the like.

Then, as described in the publication of the above Japanese Patent Application Laid-Open No. 2003-300236, it is assumed that the injection pressure is predicted, and the injection operation is stopped according to the prediction. This method however needs determining an increment in the injection pressure from after the injection operation has been stopped at the maximum injection speed till the speed is reduced to zero (i.e., an increment in the pressure during the inertial flow at the maximum injection speed). When the injection operation is stopped with resin residing in the injection screw, increase in pressure varies with the deceleration distance required until speed corresponding to the current injection speed is reduced to zero and types of resins. Therefore, an increment in the injection pressure from after the injection operation has been stopped at the maximum injection speed till the speed is reduced to zero varies with types of resins, which causes a problem in that the increment needs setting for each of resins to be used.

As a method of predicting the injection pressure, the publication of Japanese Patent Application Laid-Open No. 7-1522 describes a method of predicting a time reaching a pressure at which an injection process is to be changed to a dwelling process. This method controls the time of starting deceleration by predicting a time reaching a pressure at which the injection process is to be changed to the dwelling process. When resin chokes a mold and/or nozzle portion, increase in pressure will be proportional to the amount of movement of an injection screw, not proportional to time. Therefore it is difficult to precisely predict change in pressure due to the choke of resin in a mold and nozzle portion by time.

SUMMARY OF THE INVENTION

In accordance with a first aspect of the present invention, a pressure abnormality detecting device for an injection molding machine includes: position detecting means for detecting the position of an injection screw; speed detecting means for detecting a movement speed in the axial direction of the injection screw; pressure detecting means for detecting an injection pressure generated by the movement of the injection screw; and means for sequentially determining the rate of change in the pressure with respect to the movement distance of the injection screw from data detected with the position detecting means for the injection screw and the pressure detecting means; wherein a deceleration distance until the injection screw comes to a stop is sequentially obtained from a current speed determined by the speed detecting means during an injection process and a previously determined deceleration inherent in the machine of the injection screw, then the amount of change in the pressure generated until the injection screw comes to a stop is sequentially determined from the deceleration distance and the rate of change in the pressure, and if the sum of the amount of change in the pressure and the pressure detected by the pressure detecting means exceeds a predetermined limit pressure, the injection screw is stopped.

The deceleration may be determined from how much the injection screw moves when operated without resin in a cylinder and decelerated by maximum deceleration.

The deceleration distance may be determined from the deceleration corrected by adding thereto the amount of correction which is proportional to the pressure at the start of deceleration.

An injection speed can be determined from a screw position detected with the position detecting means instead of detecting an injection speed with the speed detecting means. A screw position can be determined from the injection speed detected with the speed detecting means, instead of detecting a screw position with the position detecting means.

In accordance with a second aspect of the present invention, a pressure abnormality detecting device for an injection molding machine includes: position detecting means for detecting the position of an injection screw; speed detecting means for detecting the speed of the injection screw; pressure detecting means for detecting an injection pressure generated by the movement of the injection screw; means for sequentially determining the rate of change in the pressure with respect to the movement distance of the injection screw from data detected by the position detecting means for the injection screw and the pressure detecting means, storing means for storing the relationship inherent in the machine between the injection speed at the start of deceleration and the deceleration distance corresponding thereto; and means for sequentially determining a deceleration distance the injection screw moves from the point where an injection operation is stopped at the current speed to the point where the injection screw comes to a stop, from the current speed detected by the speed detecting means and the stored relationship between the injection speed and the deceleration distance; wherein the amount of change in the pressure generated until the injection screw comes to a stop is sequentially determined from the deceleration distance and the rate of change in the pressure, and if the sum of the amount of change in the pressure and the pressure detected by the pressure detecting means exceeds a predetermined limit pressure, the injection screw is stopped.

The deceleration distance obtained with the means of obtaining a deceleration distance may be multiplied by the amount of correction expressed as a function of the pressure at the start of deceleration to determine a corrected deceleration distance, thereby determining the amount of change in the pressure.

The relationship between the injection speed at the start of deceleration and the deceleration distance corresponding thereto stored in the storing means may be determined from how much the injection screw moves when operated without resin in a cylinder and decelerated by maximum deceleration.

An injection speed can be determined from a screw position detected with the position detecting means instead of detecting an injection speed with the speed detecting means. A screw position can be determined from the injection speed detected with the speed detecting means, instead of detecting a screw position with the position detecting means.

According to the present invention, if it is predicted that an injection pressure which is likely to exceed the predetermined limit pressure, the injection screw is adapted to stop, so that the injection pressure will not exceed the predetermined limit pressure, preventing the breakdown of a mold and a nozzle portion. The injection pressure is predicted based on the deceleration inherent in the machine and the deceleration distance, enabling a precise prediction of the injection pressure regardless of the types of resins.

BRIEF DESCRIPTION OF THE DRAWINGS

The above and other objects and features of the present invention will be apparent from the following description of embodiments thereof with reference to the accompanying drawings, in which:

FIG. 5 is an explanatory drawing for a table of another embodiment of the pressure-abnormality detecting device according to the present invention, storing deceleration distances corresponding to injection speed at the start of deceleration.

DETAILED DESCRIPTION OF THE PREFERRED EMBODIMENTS

Figure 1:
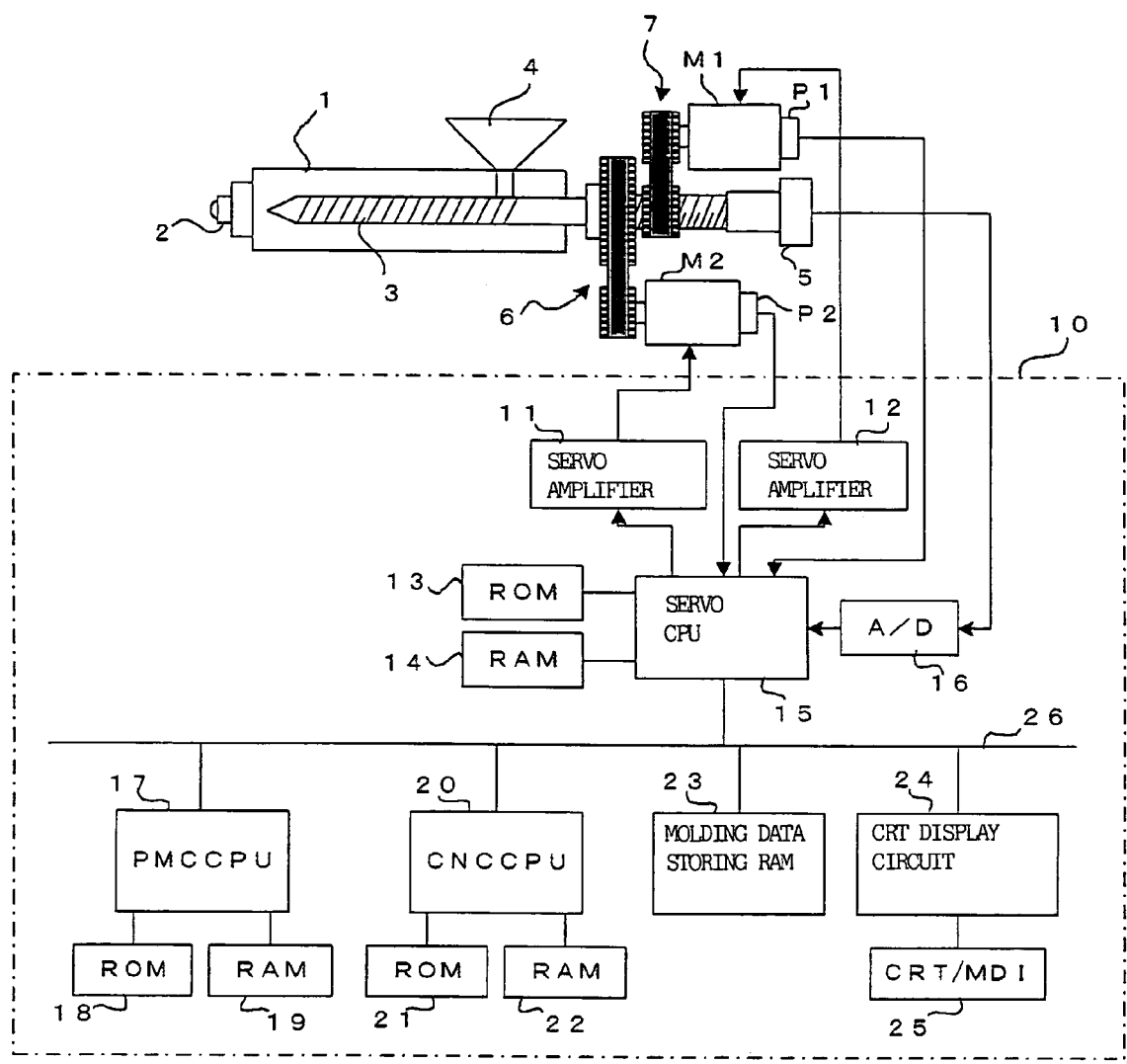
FIG. 1 is a block diagram of principal elements showing one embodiment in which a pressure-abnormality detecting device according to the present invention is applied to an electric injection molding machine.

FIG. 1 is a block diagram of the principal elements showing one embodiment in which a pressure abnormality detecting device according to the present invention is applied to an electric injection molding machine.

A nozzle portion 2 is fitted to the end of an injection cylinder 1. An injection screw 3 is inserted into the injection cylinder 1. On the injection screw 3 is provided a pressure sensor 5 such as a load cell for detecting resin pressure by the pressure applied to the injection screw 3. The injection screw 3 is rotated with a screw rotating servomotor M2 through a transmission means 6 composed of a pulley, belt and the like. The injection screw 3 is driven with an injection servomotor M1 via a transmission means 7 including a mechanism for converting the rotational motion of the pulley, belt, and ball screw/nut mechanisms into a linear motion to be moved in the direction of the axis of the injection screw 3. In FIG. 1, reference character P1 denotes a position/speed detector for detecting position and speed in the axial direction of the injection screw 3 by detecting a position and speed of the servomotor M1. Reference character P2 represents a position/speed detector for detecting a rotational position (rotational angle) and speed of the injection screw 3 by detecting a position and speed of the servomotor M2. Reference character 4 denotes a hopper for feeding resin to the injection cylinder 1.

A control device 10 for an injection molding machine composing the pressure abnormality detecting device according to the present invention includes a CNCCPU 20 being a microprocessor used for a numerical control, PMC-CPU 17 being a microprocessor used for a programmable machine controller, and a servo CPU 15 being a microprocessor used for a servo control. Communication of information can be carried out between the microprocessors via a bus 26 by selecting the inputs and outputs thereof.

The servo CPU 15 is connected to a ROM 13 for storing a control program exclusively used for the servo control to process a position loop, speed loop, and current loop and to a RAM 14 used for temporally storing data. In addition, the servo CPU 15 is connected to the pressure sensor 5 provided on the main body of the injection molding machine for detecting various pressures such as injection pressure and others via to an A/D (analog to digital) converter 16 to detect a pressure signal therefrom. Moreover, the servo CPU 15 is connected to servo amplifiers 12 and 11 for driving the injection and screw rotating servomotors M1 and M2 connected to an injecting and a screw rotating axis, respectively, in accordance with instructions from the servo CPU 15. The outputs from the position/speed detectors P1 and P2 provided on the servomotors M1 and M2 are fed back to the servo CPU 15. Rotational positions of the servomotors M1 and M2 are calculated by the servo CPU15 based upon position feedback signals from the position/speed detectors P1 and P2, and updated and stored in a register for storing a current position.

FIG. 1 shows only the servomotors M1 and M2 for driving the injecting and screw rotating axes, the position/speed detectors P1 and P2 for detecting a rotational position and speed of the servomotors M1 and M2, and the servo amplifiers 11 and 12, whereas illustration of axes such as a mold clamping axis for clamping a mold and an ejector for taking out a molding from a mold are omitted in this figure.

The PMCCPU 17 is connected to a ROM 18 for storing a sequence program to control a sequential operation of the injection molding machine and to a RAM 19 used for temporally storing operational data. The CNCCPU 20 is connected to a ROM 21 for storing an automatic operation program to control the entire injection molding machine and an emergency stop processing program related to the present invention to predict an injection pressure and to stop the machine if the pressure exceeds a limit pressure, and to a RAM 22 used for temporally storing operational data.

A molding data storing RAM 23 composed of a nonvolatile memory is a memory used for storing molding data to store molding conditions and various settings related to injection molding operations, parameters, and macro variables.

A manual data inputting device with CRT 25 is connected to the bus 26 through a CRT display circuit 24 and enables selecting graphic display screens and functional menus and inputting various data, and a numerical keypad and function keys are provided thereon. A liquid crystal display can be used as a display device.

Under the above configuration, the PMCCPU 17 controls the sequential operation of the entire injection molding machine and the CNCCPU 20 distributes movement commands to the servomotors for each axis according to the operational program stored in the ROM 21 and molding conditions stored in the molding data storing RAM 23. The servo CPU 15 performs such servo controls as position loop control, speed loop control, and current loop control as with the conventional case according to movement commands distributed to the axes and feedback signals of position and speed detected by the position/speed detectors P1 and P2, executes a so-called digital servo processing to drive and control the servomotors M1 and M2.

The above is the same in configuration as the control device for a conventional electric injection molding machine. The pressure abnormality detecting device according to the present invention is configured by the control device 10. The control device according to the present invention differs from that of the conventional electric injection molding machine in that the pressure abnormality detecting device for the injection molding machine is configured such that an emergency stop processing program for predicting an injection pressure and executing emergency stop of the screw if the pressure is abnormally increased is stored in the ROM 21 and the CNCCPU 20 executes the emergency stop processing program.

Figure 2:
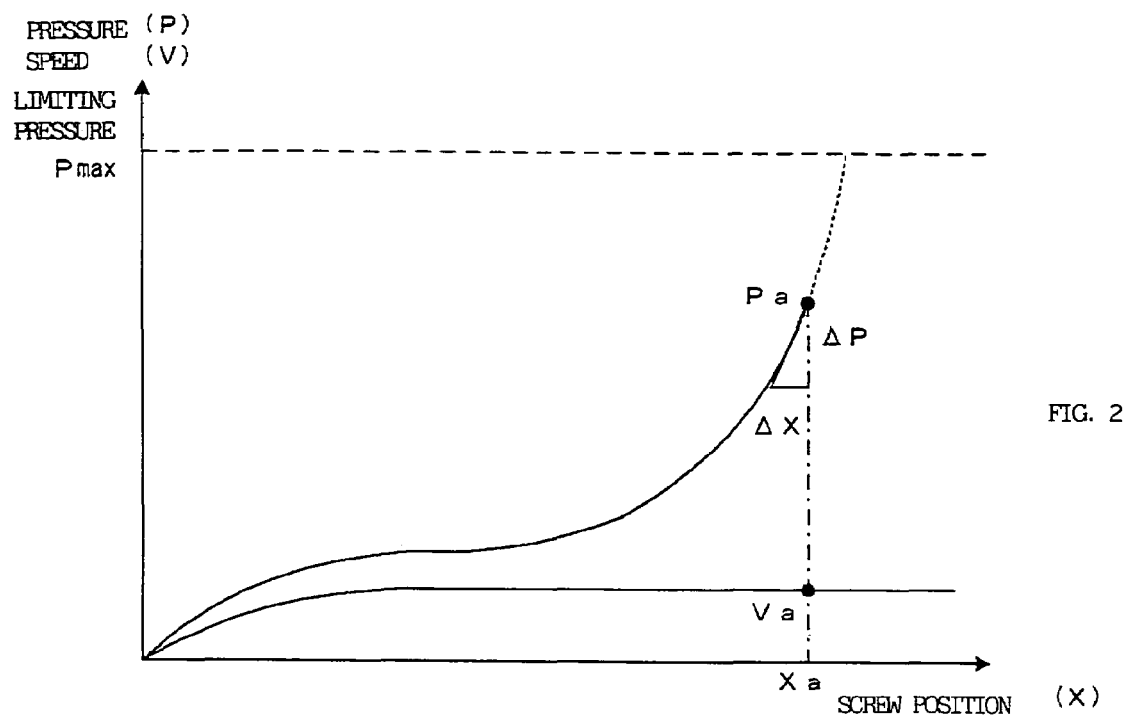
FIG. 2 is a graph showing a relationship of an injection pressure and injection speed with respect to a screw position.
Figure 3:
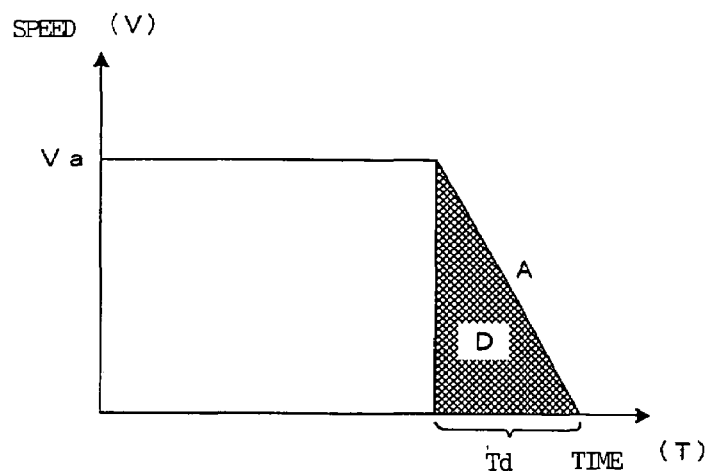
FIG. 3 is a graph showing transition of an injection speed after injection has been stopped.

FIGS. 2 and 3 are drawings for describing the principles of the present invention. In the graph of FIG. 2, an abscissa represents an injection screw position X, and an ordinate indicates an injection speed V and an injection pressure P.

An injection pressure P increases as resin is filled into a mold after injection has been started. Where, at the current sampling, an injection screw position (detected by the position/speed detector P1) is expressed by Xa, an injection speed (movement speed in the axial direction of the injection screw) by Va, and an injection pressure (detected by the pressure sensor 5) by Pa. In addition, at the sampling which precedes by one sampling period with respect to the current sampling, an injection screw position is expressed by Xa', an injection screw position by Va', and an injection speed by Pa'.

Then, the amount of movement $\Delta X$ of the injection screw 3 between the sampling periods is given by $$\Delta X = Xa - Xa',$$

and the amount of change $\Delta P$ in an injection pressure between the sampling periods is given by $$\Delta P = Pa - Pa'.$$

Therefore, the rate of change $\Delta P/\Delta X$ in an injection pressure with respect to the amount of movement of the injection screw 3 is expressed by the following equation (1):

$$\Delta P/\Delta X = (Pa - Pa')/(Xa - Xa'). \tag{1}$$

At this point, let D be a deceleration distance that is from the point where deceleration has started at the speed Va to the point where the injection screw 3 comes to a stop, in a case where an injection operation is stopped at the position Xa to decelerate the injection screw 3 by maximum deceleration. Thus, an increment of the injection pressure due to movement of the deceleration distance D is given by $D \cdot \Delta P/\Delta X$, if the injection pressure is changed with the rate of change in the injection pressure at the position.

Therefore, a predicted injection pressure Pa* at a deceleration distance D can be obtained by the following equation:

$$Pa^* = Pa + (\Delta P/\Delta X) \cdot D. \tag{2}$$

Then, the predicted injection pressure Pa* is compared with a predetermined limit pressure Pmax. If the predicted injection pressure Pa* exceeds the predetermined limit pressure Pmax, the injection operation is discontinued to stop the drive of the injection screw 3, thereby enabling suppressing the pressure to the order of the predetermined limit pressure Pmax even though the injection screw 3 moves by the deceleration distance D due to inertia.

The foregoing deceleration distance D can be obtained in the following manner. A graph in FIG. 3 describes how to obtain the deceleration distance D. An abscissa represents time T, and an ordinate indicates an injection speed V. Reference character A means deceleration and is obtained as a value inherent in the injection molding machine in advance. Where, letting Td be a time interval from the time when the deceleration starts at the injection speed Va to the time when the injection speed becomes zero, the following equations are given:

$$D = Td \cdot Va/2 \qquad (3)$$

$$A = Va/Td \qquad (4)$$

thus, the deceleration distance D can be obtained by $$D = Va^2/2A. \qquad (5)$$

To obtain the deceleration distance D, the deceleration A is previously set. The deceleration A which is a value inherent in the machine can be theoretically calculated and set after configuration of the injection mechanism of the injection molding machine is determined. The deceleration A can be calculated in the following simple manner. First, an injecting operation is performed without resin in the injection cylinder 1 and stopped halfway. Then, the injection speed Va at the time of stoppage and the time Td during which the injection speed is reduced to zero are measured. The deceleration A is thus obtained from the injection speed Va and the time Td by calculating the above equation (4).

The deceleration A to be set is a value inherent in the machine without resin in the injection cylinder 1 and can be found if the configuration of the machine is determined. Actually, however, resin exists in the cylinder 1. The resin is not particularly influential, so that it may be neglected. However, the resistance of the resin helps the injection screw 3 stop. Then, the deceleration A is modified by adding the amount of correction α thereto to obtain a corrected deceleration distance D' from the following equation (6):

$$D' = Va^2/2(A+\alpha). \qquad (6)$$

Since the amount of correction α is proportional to the injection pressure Pa at the start of deceleration, it can be obtained from the detected injection pressure Pa by letting α=k·Pa (where, k is a proportional constant). In this case, the corrected deceleration distance D' can be obtained by the following equation:

$$D' = Va^2/2(A+k \cdot Pa). \qquad (7)$$

Figure 4:
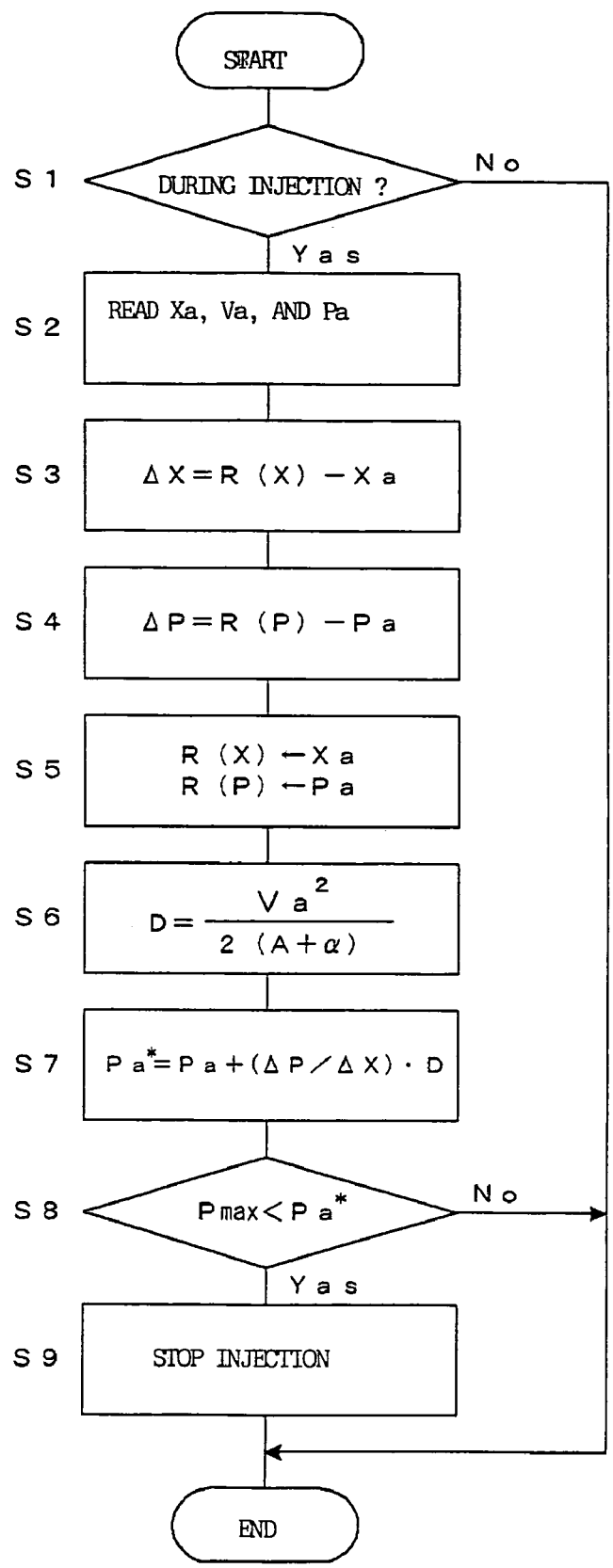
FIG. 4 shows a flow chart for processing executed by one embodiment of the pressure-abnormality detecting device according to the present invention.

FIG. 4 shows a flow chart of the emergency stop processing program in which the CNCCPU 20 predicts an injection pressure every predetermined period and urgently stops an injection operation according to the injection pressure.

The CNCCPU 20 determines by a flag whether injection is being performed or not (when injection is started, a flag showing the injection being in process is up by another injection processing program, when the injection process is terminated, the flag is down.) (Step S1). Unless injection is being performed, the process for the current period is terminated.

When injection is being performed, the injection screw position Xa, and injection speed Va detected by the position/speed detector P1, and the injection pressure Pa detected by the pressure sensor 5 and inputted through the A/D converter 16, are read (Step S2). Next, the injection screw position Xa and the injection pressure Pa read in the current period are subtracted from the injection screw position detected in the previous period and stored in the register R(X) and from the injection pressure detected in the previous period stored in the register R(P), respectively, to obtain the amount of movement ΔX of the injection screw 3 and the amount of change ΔP in the injection pressure between the sampling periods (Steps S3 and S4). The position X and injection pressure P at the time when the injection is started are set in the register as initial settings. After start of injection, the injection screw position Xa and the injection pressure Pa detected in the current period obtained in the Step S2 are stored in the registers R(X) and R(P), respectively.

Incidentally, the amount of movement ΔX of the injection screw 3 can be obtained by the equation ΔX=Va·t using the injection speed Va and a sampling period t (the period during which the process shown in FIG. 4 is executed). The amount of movement ΔX of the injection screw 3 may be obtained by the amount of movement (the amount of feedback pulses) detected by the position/speed detector P1 between the sampling periods. In addition, the injection speed Va can be obtained from the signal outputted from the position detector without a speed detector. In other words, the injection speed Va may be found by dividing the difference between the positions of the injection screw 3 at the current period and at the period preceding by one period thereto by the sampling period. Thus, it is necessary only to provide either of the position detector or speed detector.

Subsequently, the deceleration distance D is determined from the abovementioned equations (6) and (7) based on the predetermined deceleration A, an amount of correction α (or, deceleration A and k, if the amount of correction α is set on the assumption that it is considered as proportional to the injection pressure Pa at the start of deceleration, that is, α=k·Pa), and the injection speed Va determined in the Step S2 (Step S6).

A predicted injection pressure Pa* (an injection pressure supported to be generated if the injection operation is stopped and as a result the injection screw travels the deceleration distance D) is determined by calculating the above equation (2) using the deceleration distance D determined in the Step S6, the amount of movement ΔX of the injection screw 3 and the amount of change ΔP in the injection pressure in the sampling period t (the period during which the process shown in FIG. 4 is executed) determined in the Steps S3 and S4, and the injection pressure Pa obtained in the Step S2 (Step S7).

The predicted injection pressure Pa* thus determined is compared with the predetermined limit pressure Pmax (Step S8). If the predicted injection pressure Pa* does not exceed the predetermined limit pressure Pmax, the process at the current period is terminated. If the predicted injection pressure Pa* exceeds the predetermined limit pressure Pmax, the injection operation is stopped to urgently decelerate and stop the injection screw 3 (Step S9). As a result, even if the injection screw 3 travels the deceleration distance D due to inertia, an injection pressure approximate to the predetermined limit pressure Pmax will be produced, but a pressure substantially exceeding the limit pressure Pmax will not be produced, thereby preventing the breakdown of a mold and nozzle portion.

In the foregoing embodiment, while the deceleration distance D is obtained by calculating the equations (6) and (7), the deceleration distance D may be found using a table as shown in FIG. 5 for storing the deceleration distances D corresponding to injection speed Va at the start of deceleration, stored in the data storing RAM 23 composed of the ROM 21 or a nonvolatile memory. In this case, if a currently detected speed Va has not been set in the table, a deceleration distance can be determined from the speeds at the start of deceleration, approximate to the current speed Va stored in the table (speeds and deceleration distances at the start of deceleration) by means of interpolation by a linear function. Alternatively, an approximate equation of a deceleration distance corresponding to a speed at the start of deceleration is obtained from the data stored in the table to find a deceleration distance from the current speed.

The deceleration distance D corresponding to the injection speed Va at the start of deceleration stored in the table is inherent in the machine and may be determined by calculation. However, the deceleration distance can be determined by abruptly stopping the injection screw which is moving at various injection speeds and obtaining decelerated distance which the injection screw moves by inertia until its speed reduces to zero.

Actually, however, resin exists in the cylinder 1, so that the resistance of the resin helps the injection screw 3 stop. Since the resin is not particularly influential, it may be neglected, however, with this influence in view, the deceleration distance D determined from the table or calculated may be corrected.

If a deceleration torque is F, an inertial mass in the driven system of the injection screw and the like is m, and deceleration is A, a deceleration torque F is expressed by the following equation:

$$F = m \cdot A. \quad (8)$$

If the deceleration torque in the equation (8) is influenced by the pressure of resin, $$F + \beta = m \cdot A'. \quad (9)$$

The deceleration distance D' is given by $$\begin{aligned} D' &= Va^2/2A' \\ &= m \cdot Va^2/2(F + \beta) \\ &= Va^2/2((F/m + (\beta/m)) \\ &= Va^2/2(A + (\beta/m)). \end{aligned} \quad (10)$$

Comparison of the equation (6) with the equation (10) shows that ($\beta$/m) is equal to $\alpha$.

The deceleration distance D, not yet corrected taking account of the resin which exists, is given by $$D = m \cdot Va^2/2F. \quad (11)$$

Then, the ratio of D' before correction to D after correction is given by $$\begin{aligned} D'/D &= (m \cdot Va^2/2(F + \beta))/(m \cdot Va^2/2F) \\ &= F/(F + \beta) = 1/(1 + (\beta/F)) \\ &= 1/(1 + (A \cdot \beta/m)) \\ &= 1/(1 + (A \cdot \alpha)) \end{aligned} \quad (12)$$

As described above, the amount of correction $\alpha$ is proportional to the injection pressure Pa and equals k·Pa, so that the ratio of D' before correction to D after correction is expressed by the following equation:

$$D'/D = 1/(1 + A \cdot k \cdot Pa). \quad (13)$$

where, A and k are constants. Letting A·k=K leads to the following equation:

$$D' = D \cdot (1/(1 + K \cdot Pa)). \quad (14)$$

Hence, as shown in the equation (14), the deceleration distance D obtained by calculation or the table can be multiplied by the amount of correction expressed as a function of the injection pressure Pa at the start of deceleration (1/(1+K·Pa)) to determine the corrected deceleration distance D taking account of the influence of resin.

When the deceleration distance is obtained by the table, the process in the Step S6 in FIG. 4 in which the deceleration distance D (or, a corrected deceleration distance) is obtained from the injection pressure Pa detected in the Step S2 is changed to the process in which the deceleration distance D is obtained from the table. The other processes are the same as those shown in FIG. 4.

Where, the equation (2) for determining the predicted injection pressure Pa* when the injection screw moves the deceleration distance D can be expressed by the following equation using the equation (5):

$$\begin{aligned} Pa^* &= Pa + (\Delta P/\Delta X) \cdot D \\ &= Pa + (\Delta P/\Delta X) \cdot [Va^2/2A'] \end{aligned}$$

(where, A'=A+$\alpha$ or A+K·Pa).

Where, $\Delta X$=Va·t (t: sampling period), so that the predicted injection pressure Pa* can be further expressed as:

$$\begin{aligned} Pa^* &= Pa + (\Delta P/\Delta X) \cdot [(\Delta X/t)^2 \cdot /2A'] \\ &= Pa + (\Delta P \cdot \Delta X)/(2A' \cdot t^2). \end{aligned} \quad (15)$$

Furthermore, as described above, $\Delta X$=Va·t, therefore the equation (15) is expressed by the following equation:

$$Pa^* = Pa + (\Delta P \cdot Va)/(2A' \cdot t). \quad (16)$$

According to the above equation (15), variables of Pa* are Pa, $\Delta P$, and $\Delta X$, so that the predicted injection pressure Pa* can be obtained only by the pressure detector, position detector, means such as a register and the like for holding the outputs, preceding by one sampling period, of the pressure detector and position detector, means for storing data of the above A', and means for calculating the equation (15).

According to the above equation (16), variables of Pa* are Pa, $\Delta P$, and Va, so that the predicted injection pressure Pa* can be obtained only by the pressure detector, speed detector, means such as a register and the like for holding the output, preceding by one sampling period, of the pressure detector, means for storing data of the above A', and means for calculating the equation (16).

What is claimed is:

1. A pressure abnormality detecting device for an injection molding machine, comprising:
   position detecting means for detecting the position of an injection screw;
   speed detecting means for detecting a movement speed in the axial direction of the injection screw;
   pressure detecting means for detecting an injection pressure generated by the movement of the injection screw; and
   means for sequentially determining the rate of change in the pressure with respect to the movement distance of the injection screw from data detected with the position detecting means for the injection screw and the pressure detecting means;
   wherein a deceleration distance until the injection screw comes to a stop is sequentially obtained from a current speed determined by the speed detecting means during an injection process and a previously determined deceleration inherent in the machine of the injection screw,
then the amount of change in the pressure generated until the injection screw comes to a stop is sequentially determined from the obtained deceleration distance and the rate of change in the pressure, and
if the sum of the amount of change in the pressure and the pressure detected by the pressure detecting means exceeds a predetermined limit pressure, the injection screw is stopped.

2. The pressure abnormality detecting device for an injection molding machine according to claim 1, wherein the deceleration is determined from how much the injection screw moves when operated without resin in a cylinder and decelerated by maximum deceleration.

3. The pressure abnormality detecting device for an injection molding machine according to claim 1, wherein the deceleration distance is determined from the deceleration corrected by adding thereto the amount of correction which is proportional to the pressure at the start of deceleration.

4. A pressure abnormality detecting device for an injection molding machine comprising:
   position detecting means for detecting the position of an injection screw;
   speed detecting means for detecting the speed of the injection screw;
   pressure detecting means for detecting an injection pressure generated by the movement of the injection screw;
   means for sequentially determining the rate of change in the pressure with respect to the movement distance of the injection screw from data detected by the position detecting means for the injection screw and the pressure detecting means;
   storing means for storing the relationship inherent in the machine between the injection speed at the start of deceleration and the deceleration distance corresponding thereto; and
   means for sequentially determining a deceleration distance of the injection screw moves from the point where an injection operation is stopped at the current speed to the point where the injection screw comes to a stop, from the current speed detected by the speed detecting means and the stored relationship between the injection speed and the deceleration distance;
   wherein the amount of change in the pressure generated until the injection screw comes to a stop is sequentially determined from the deceleration distance and the rate of change in the pressure, and if the sum of the amount of change in the pressure and the pressure detected by the pressure detecting means exceeds a predetermined limit pressure, the injection screw is stopped.

5. The pressure abnormality detecting device for an injection molding machine according to claim 4, wherein the deceleration distance obtained with the means of obtaining a deceleration distance is multiplied by the amount of correction expressed as a function of the pressure at the start of deceleration to determine a corrected deceleration distance, thereby determining the amount of change in the pressure.

6. The pressure abnormality detecting device for an injection molding machine according to claim 4, wherein the relationship between the injection speed at the start of deceleration and the deceleration distance corresponding thereto stored in the storing means is determined from how much the injection screw moves when operated without resin in a cylinder and decelerated with maximum deceleration.

7. The pressure abnormality detecting device for an injection molding machine according to claim 1 or claim 4, wherein an injection speed is determined from a screw position detected with the position detecting means instead of detecting an injection speed with the speed detecting means.

8. The pressure abnormality detecting device for an injection molding machine according to claim 1 or claim 4, wherein a screw position is determined from the injection speed detected with the speed detecting means instead of detecting a screw position with the position detecting means.

9. A device for predicting an injection pressure generated at the time of interruption in an injection molding machine, comprising:
   pressure detecting means for detecting the injection pressure generated by the movement of an injection screw;
   position detecting means for detecting the position of the injection screw;
   output holding means for holding the outputs, preceding by one sampling period, of the pressure detecting means and the position detecting means;
   storing means for storing constants inherent in the machine; and
   calculating means for calculating a predicted injection pressure that is generated while the injection screw moves and stops after injection has been interrupted at the current moment on the basis of outputs detected by the pressure detecting means and the position detecting means, data held with the holding means, and constants stored in the storing means.

10. A device for predicting an injection pressure generated at the time of interruption in an injection molding machine, comprising:
   pressure detecting means for detecting the injection pressure generated by the movement of an injection screw;
   speed detecting means for detecting a movement speed in the axial direction of the injection screw;
   output holding means for holding the output, preceding by one sampling period, of the pressure detecting means;
   storing means for storing constants inherent in the machine; and
   calculating means for calculating a predicted injection pressure that is generated while the injection screw moves and stops after injection has been interrupted at the current moment on the basis of outputs detected by the pressure detecting means and the speed detecting means, data held with the holding means, and constants stored in the storing means.

* * * * *

UNITED STATES PATENT AND TRADEMARK OFFICE
CERTIFICATE OF CORRECTION

| | | |
|---|---|---|
| PATENT NO. | : 7,313,967 B2 | Page 1 of 1 |
| APPLICATION NO. | : 11/359601 | |
| DATED | : January 1, 2008 | |
| INVENTOR(S) | : Tatsuhiro Uchiyama et al. | |

It is certified that error appears in the above-identified patent and that said Letters Patent is hereby corrected as shown below:

In the drawings:

Sheet 3 of 4 (FIG. 4), between Reference S1 and S2, change "Yas" to --Yes--.

Sheet 3 of 4 (FIG. 4), between Reference S8 and S9, change "Yas" to --Yes--.

Column 9, Line 51, after "))" insert --.--.

Column 11, Line 5, after "the" delete "obtained".

Signed and Sealed this

Sixteenth Day of February, 2010

David J. Kappos
*Director of the United States Patent and Trademark Office*